United States Patent [19]

Soper

[11] Patent Number: 5,603,952
[45] Date of Patent: Feb. 18, 1997

[54] METHOD OF ENCAPSULATING FOOD OR FLAVOR PARTICLES USING WARM WATER FISH GELATIN, AND CAPSULES PRODUCED THEREFROM

[75] Inventor: Jon C. Soper, Huber Heights, Ohio

[73] Assignee: Tastemaker, Cincinnati, Ohio

[21] Appl. No.: 367,072

[22] Filed: Dec. 30, 1994

[51] Int. Cl.$^6$ .................................................... A61K 9/64
[52] U.S. Cl. .......................................... 424/456; 424/464
[58] Field of Search .................................. 424/456, 464; 106/124; 426/49

[56] References Cited

U.S. PATENT DOCUMENTS

| | | | |
|---|---|---|---|
| Re. 24,899 | 11/1960 | Green | 252/316 |
| 3,876,803 | 4/1975 | Stephan et al. | 426/1 |
| 3,894,391 | 10/1976 | Nitschmann et al. | 260/117 |
| 4,601,896 | 7/1986 | Nugent | 106/124 |
| 5,035,896 | 7/1991 | Apfel et al. | 424/456 |
| 5,219,574 | 6/1993 | Wehling et al. | 424/464 |
| 5,340,594 | 8/1994 | Barclay | 426/49 |

FOREIGN PATENT DOCUMENTS 1529055  6/1966  France.

*Primary Examiner*—Thurman K. Page
*Assistant Examiner*—William E. Benston, Jr.
*Attorney, Agent, or Firm*—Wood, Herron & Evans, P.L.L.

[57] ABSTRACT

This invention is directed to a method of forming microencapsulated food or flavor capsules as well as the capsules produced by the method. The method includes providing food or flavor particles to be encapsulated, and forming a mixture of a warm water fish gelatin and the food or flavor particles in aqueous media. The method further includes microencapsulating the particles with the gelatin at elevated temperatures by complex coacervation to form the microencapsulated capsules. If desired, the method may further include the step of separating the capsules. In a preferred form, the method is conducted at a temperature of about 33° C. to about 35° C. Preferably, the warm water fish gelatin used in the encapsulation method has a bloom of from about 150 to about 300 bloom, more preferably from about 250 to about 300 bloom. Many different kinds of food or flavor particles may be used, such as for example, vegetable oil, lemon oil, garlic flavor, apple flavor or black pepper. The invention also is directed to the food or flavor capsules produced by the method.

12 Claims, No Drawings

METHOD OF ENCAPSULATING FOOD OR FLAVOR PARTICLES USING WARM WATER FISH GELATIN, AND CAPSULES PRODUCED THEREFROM

BACKGROUND OF THE INVENTION

This invention relates to microencapsulation of food or flavor particles, and more particularly to microencapsulation of food or flavor particles by complex coacervation at elevated temperatures using a warm water fish gelatin.

U.S. Pat. No. 5,035,896 to Apfel et al. teaches water insoluble drugs coated by simple coacervation using a low bloom fish gelatin which coacervates at ambient temperature, i.e., room temperature of about 16°–27° C. However, the U.S. Pat. No. '896 patent does not disclose the use of fish gelatin in encapsulating other kinds of particles. Furthermore, the U.S. Pat. No. '896 coacervation process is limited to ambient or room temperature coacervation.

SUMMARY OF THE INVENTION

This invention is directed to a method of forming microencapsulated food or flavor capsules as well as the capsules produced by the method. The method includes providing food or flavor particles to be encapsulated, and forming a mixture of a warm water fish gelatin and the food or flavor particles in aqueous media. The method further includes microencapsulating the particles with the gelatin at elevated temperatures by complex coacervation to form the microencapsulated capsules. If desired, the method may further include the step of separating the capsules.

In a preferred form, the method is conducted at a temperature of about 33° C. to about 35° C. Preferably, the warm water fish gelatin used in the encapsulation method has a bloom of from about 150 to about 300 bloom, more preferably from about 250 to about 300 bloom. Many different kinds of food or flavor particles may be used, such as for example, vegetable oil, lemon oil, garlic flavor, apple flavor or black pepper. The invention also is directed to the food or flavor capsules produced by the method.

This invention offers several benefits and advantages. For example, the method provides a way of encapsulating food or flavor particles using fish gelatin instead of other gelatin such as bovine or porcine gelatin. Also, the fish gelatin employed is a kosher fish gelatin; therefore, any kosher food or flavor particle will remain kosher upon encapsulation. In addition, the coacervation method is conducted at elevated temperatures, and does not require ambient/room temperature for coacervation.

DETAILED DESCRIPTION OF THE INVENTION

The invention is directed to a method of forming microencapsulated food or flavor capsules, as well as to the capsules produced from the method. The method includes providing food or flavor particles to be encapsulated, and forming a mixture of a warm water fish gelatin and the food or flavor particles in an aqueous media. The method further includes microencapsulating the particles with the gelatin at elevated temperatures by complex coacervation to form the microencapsulated capsules.

The warm water fish gelatin used in the method may be any warm water fish gelatin. However, in a preferred form of the invention, the fish gelatin has a bloom of from about 150 to about 300 bloom, and more preferably, a bloom of from about 250 to about 300 bloom. Such high bloom warm water fish gelatins are available from Food Industries Testing of Miami, Fla. under the product name Gelcine KFX. One of the advantages of using the fish gelatin is that it is kosher. Therefore, kosher food or flavor particles retain their kosher status upon encapsulation with the fish gelatin.

As stated above, the method further includes microencapsulating the particles with the gelatin at elevated temperatures by complex coacervation. As used herein, "elevated temperatures" means temperatures above ambient or room temperatures, i.e., above 16°–27° C. During complex coacervation, a protein coating is formed over the food or flavor particles to produce microencapsulated capsules. The protein coating may then be cross linked by covalent or ionic bonding with a cross linking agent, and if desired, the capsules may be spray dried or otherwise dewatered at a suitable temperature for the removal of water.

By employing the method of this invention, food or flavor particles in amounts of up to 95% by weight, typically within the range of about 50% to 95% by weight, are encapsulated in a protein coating, i.e., at a ratio of about 10:1 to about 5:1 of particles to coating. Usually, about 70% to about 95% by weight particle encapsulation is achieved. In another feature of the invention, a drying aid is added to the coacervated emulsion of food or flavor particles before spray drying or dewatering. This drying aid has the effect of lubricating these spray dried, or otherwise dewatered particles and provides for uniform distribution of the particles.

A variety of food or flavor particles may be encapsulated, such as for example, vegetable oil, lemon oil, garlic flavor, apple flavor or black pepper. Examples of other flavor oils include flavoring aromatic compounds and/or oils, oleoresins and extracts derived from plants, leaves, flowers, fruits and so forth, and combinations thereof. Flavor oils include cinnamon oil, oil of wintergreen, peppermint oil, bay oil, thyme oil, spearmint oil, cassia oil, and the like. Artificial, natural and synthetic fruit flavors such as vanilla, and citrus oils including lemon, orange, grapefruit, lime, and fruit essences including apple, pear, peach, strawberry, cherry, and so forth, may be used. These flavoring oils may be used individually or in a mixture as is well known in the art.

The coating layer, as prepared by complex coacervation comprises colloidal materials which must be hydrophilic, gellable and ionizable. Colloidal materials may be selected from the group consisting of a warm water fish gelatin, alginates, casein, gum arabic, carboxymethylcellulose and the like, and mixtures thereof.

Complex coacervation is practiced usually by first forming a solution of a first colloidal material, such as the warm water fish gelatin, in water above its gelation temperature. Separately, a second colloidal material, such as gum arabic or carboxymethylcellulose for example, is added to water to form a clear solution. The two solutions then are mixed, the temperature may be reduced, and the flavor oil is mixed into the resulting solution at a mixing speed to form the desired emulsion. Complex coacervation, or aggregation to uniformly distribute the colloidal materials around the food or flavor particles, then is carried out by diluting the emulsion with water, or adjusting the pH and allowing an elapsed time for the colloid to coat the particles. Then, in order to render the gelatin capsules insoluble, it is usually necessary to cross link the colloidal coating on the particles, and in a preferred form, glutaraldehyde is used to cross link the gelatin coating surrounding the particles. Alum also may be used to cross link the coated food or flavor particles.

It is preferred to add a drying aid to the slurry of coated microcapsules in aqueous medium prior to spray-drying or dewatering. Silicon dioxide is a preferred drying agent having a particle size of less than 400 mesh, but the fineness of the drying agent is not critical. The coated flavor capsules are now ready for spray-drying and this may be accomplished by employing a spray-drying tower fitted with an air atomization nozzle for spraying countercurrent to the heated airflow. The coated food or flavor capsules are delivered to the spray nozzle by a pump at a suitable rate per hour. Atomization may be achieved in a number of ways. For example, air atomization, spinning disk or airless atomization may be employed.

The resulting food or flavored capsules may be prepared in different forms, such as a liquid suspension or slurry (typically about 1% to about 40% by weight solids), a paste (about 36% to about 60% by weight solids), or a dry powder. The slurry form may have advantage in certain applications because of the benefits of particle cost savings, easy handling, and better particle containment because of reduced particle volatility in the water. The aqueous food or flavor capsules may be delivered by a pump at a suitable rate per hour in processing to afford easy handling.

The following examples illustrate the practice of this invention. It will be understood, however, that these examples are not intended to limit the scope of the invention, which is to be determined by the appended claims and their equivalents.

EXAMPLE 1

Aqueous Capsules of Flavor Particles and Cross-Linked Warm Water Fish Gelatin Coating An aqueous suspension of vegetable oil microcapsules was produced according to the method of the invention. The warm water fish gelatin 300 bloom Gelcine KFX supplied by Food Industry Testing of Miami, Fla. was used to form 200 grams of a 10% fish gelatin solution at 33° C. Then 100 grams of a 4% CMC/ARABIC gum solution was prepared at room temperature. The gum and gelatin solutions were combined followed by the addition of 160 grams of vegetable oil. 600 grams of dilution water at 35° C. was added to the emulsion, and the resulting solution was cooled over a 30-minute period to a temperature of about 25° C. 2.5 grams of a 50% aqueous solution of gluteraldehyde was added in order to cross link the gelatin. The result was an excellent aqueous suspension of microcapsules. In addition, a similar batch of capsules were prepared using the above steps, but substituting a 250 bloom warm water fish gelatin for the 300 bloom gelatin used above.

Additional aqueous suspensions of microcapsules were prepared using lemon oil, garlic flavor or apple flavor instead of the vegetable oil discussed above. The method conducted using these particular flavors also resulted in an excellent aqueous suspension of microcapsules.

EXAMPLE 2

Spray-Dried, Free-Flowing Capsules of Flavor Particles And Cross-Linked Warm Water Fish Gelatin Coating The aqueous suspensions of lemon oil, garlic flavor and apple flavor capsules prepared in Example 1 above were further processed to form dry powders of flavor capsules. In order to form the dry powders, silicon dioxide was mixed into the slurries or aqueous suspensions to act as a drying aid upon spray-drying. The suspensions were then spray-dried using the spray-drying technique discussed above. This process resulted in dry, free flowing microcapsules.

I claim:

1. A process of microencapsulating food or flavor particles comprising the steps of:

providing food or flavor particles to be encapsulated;

forming a mixture of a warm water fish gelatin and said food or flavor particles in aqueous media; and microencapsulating said particles with said gelatin at a temperature greater than 27° C. by complex coacervation with at least two different colloidal materials to form microencapsulated capsules.

2. The method of claim 1 conducted at a preferred temperature of about 33° C. to about 35° C.

3. The method of claim 1 further comprising the step of separating said capsules.

4. The method of claim 1 wherein said fish gelatin has a bloom of from about 150 to about 300 bloom.

5. The method of claim 1 wherein said fish gelatin has a bloom of from about 250 to about 300 bloom.

6. The method of claim 1 wherein said particles to be encapsulated are selected from the group consisting of vegetable oil, lemon oil, garlic flavor, apple flavor and black pepper.

7. The product produced by the method of claim 1.

8. The product produced by the method of claim 2.

9. The product produced by the method of claim 3.

10. The product produced by the method of claim 6.

11. The product produced by the method of claim 1 wherein said product is kosher.

12. A process of microencapsulating liquid flavor particles comprising the steps of:

providing liquid flavor particles to be encapsulated;

forming a mixture of a warm water fish gelatin and said liquid flavor particles in aqueous media; and microencapsulating said particles with said gelatin at a temperature greater than 27° C. by complex coacervation with at least two different colloidal materials to form microencapsulated capsules.

* * * * *